(12) United States Patent
Lusty et al.

(10) Patent No.: US 11,400,775 B2
(45) Date of Patent: Aug. 2, 2022

(54) TRAILER HITCH DEVICE FOR GARDEN TRACTOR

(71) Applicant: BAC INDUSTRIES, INC., Miltona, MN (US)

(72) Inventors: Robert H. Lusty, Alexandria, MN (US); James D. Oberg, Eagle Bend, MN (US)

(73) Assignee: BAC Industries, Inc., Miltona, MN (US)

( * ) Notice: Subject to any disclaimer, the term of this patent is extended or adjusted under 35 U.S.C. 154(b) by 345 days.

(21) Appl. No.: 16/847,930

(22) Filed: Apr. 14, 2020

(65) Prior Publication Data

US 2021/0316579 A1 Oct. 14, 2021

(51) Int. Cl.
*B60D 1/06* (2006.01)
*B60D 1/46* (2006.01)

(52) U.S. Cl.
CPC .............. *B60D 1/065* (2013.01); *B60D 1/46* (2013.01)

(58) Field of Classification Search
CPC .................................. B60D 1/065; B60D 1/46
USPC ....................................................... 224/520
See application file for complete search history.

(56) References Cited

U.S. PATENT DOCUMENTS

| 4,946,182 | A | * | 8/1990 | Weber .................... | B60D 1/465 280/490.1 |
|---|---|---|---|---|---|
| 6,902,182 | B1 | | 6/2005 | Kamunen | |
| 7,784,813 | B2 | | 8/2010 | Columbia | |
| 7,862,066 | B2 | | 1/2011 | Smith | |
| 8,276,932 | B2 | | 10/2012 | Columbia | |
| 9,676,239 | B1 | * | 6/2017 | Lusty .................... | B62D 53/00 |
| 10,091,924 | B2 | * | 10/2018 | Fay, II .................... | B60D 1/167 |
| 2003/0015856 | A1 | | 1/2003 | Hancock et al. | |

* cited by examiner

*Primary Examiner* — Kevin Hurley
*Assistant Examiner* — Hosam Shabara
(74) *Attorney, Agent, or Firm* — Bradley J. Thorson; DeWitt LLP

(57) ABSTRACT

A trailer hitch assembly for use with utility vehicles that allows for adjustment of the height that a tongue of a trailer may be set. A telescoping sliding relation between a tubular post that is adapted to be joined to a towing vehicle and a shaft to which a hitch ball is joined and with a thorough pin for locking the two at selected extension lengths accommodates a variety of carts/trailers for use with differing models of utility vehicles. The invention further includes support straps of adjustable length that join the telescoping assembly to the towing vehicle.

5 Claims, 2 Drawing Sheets

TRAILER HITCH DEVICE FOR GARDEN TRACTOR

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to utility vehicles such as garden tractors and ATVs more particularly to an improved trailer hitch arrangement for use with such vehicles.

II. Discussion of the Prior Art

Owners of utility vehicles such as riding lawnmowers, garden tractors and all-terrain vehicles can increase the utility thereof if means are provided for towing a cart or trailer for hauling materials such as brush, leaves, dirt and garden mulch. For this reason, manufacturers of such utility vehicles provide a frame member at the rear of the vehicle on which a trailer hitch ball can be fastened. The frame member is generally a horizontal plate that is only a few inches above ground level. Moreover, the frame member is generally a flat sheet of steel that is subject to being bent by the tongue weight of a trailer, especially if the trailer is heavily loaded. Another problem with the trailer hitch ball mounted directly on the vehicle frame member is that it tends to position a trailer tongue at a downward angle with respect to the horizontal. Depending upon the terrain for which a trailer is being towed by a lawn tractor the trailer tongue may actually strike the ground.

Garden tractors and other utility vehicles equipped with a trailer are commonly used in hunting, farming, landscaping, gardening and the like. A variety of hitch mechanisms have been used in the past for coupling a trailer or cart to an all-terrain vehicle, riding lawnmower and garden tractors including, but not limited to, pintles, chains, strap attachments and ball hitches. As those skilled in the art will recognize, hitch assemblies, attachments and similar implements for use with ATVs and lawn and garden tractors need to be adaptable for the towing vehicles of various manufacturers and for different attachments to be towed. It is accordingly a principle object of the present invention to provide an improved hitch attachment that is highly adjustable so as to be able to accommodate a variety of vehicle types and towed attachments.

SUMMARY OF THE INVENTION

In accordance with the present invention there is provided a trailer hitch especially designed for use with utility vehicles such as all-terrain vehicles, garden tractors and riding lawnmowers in which an elongated tubular post having a lumen with first and second ends has the first, lower end welded to a steel plate and at an acute angle thereto and where the first plate is adapted to be removably bolted to a horizontal frame member of the vehicle. A shaft member that is sized to fit and slide within the lumen of the tubular post has a second plate member affixed to it in such a way that the second plate extends generally parallel to the first plate when the shaft member is telescopingly inserted into the lumen of the tubular post. The second plate member has a trailer hitch ball fastened to a top surface thereof and the telescoping feature allows the hitch ball to be set at differing elevations with respect to the ground. Completing the assembly is at least one, and preferably two rigid strap members whose lengths can be adjusted and where the strap members are fastened at one end to the tubular post and at the other end connected to the vehicle's frame member.

To achieve adjustability the shaft member carrying the hitch ball has a plurality of apertures spaced along a length dimension of the shaft allowing a pin to be insertable through aligned apertures formed through opposed sidewalls of the tubular post and through a selected one of the plurality of apertures in the shaft. Each of the strap members includes first and second sections that partially overlap and are secured to one another by bolts extending through selected ones of a plurality of apertures formed through the overlapped first and second sections.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
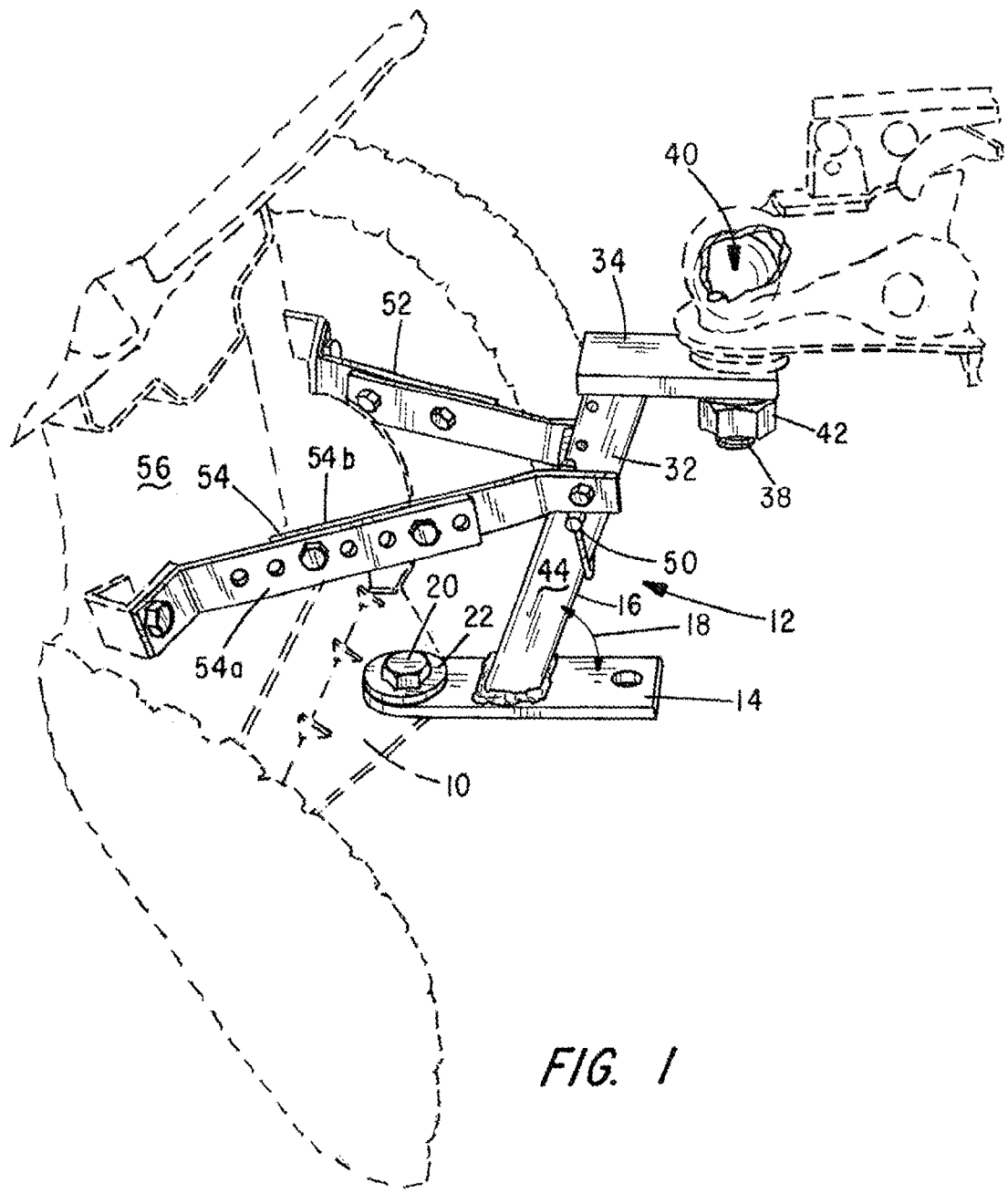
FIG. 1 is a partial perspective view of a rear end portion of a utility vehicle with the trailer hitch of the present invention joined thereto.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise. As used herein, the term "utility vehicle" is meant to include lawn and garden tractors, riding lawnmowers, all-terrain vehicles (ATVs) and the like.

Referring to FIG. 1 of the drawings there is shown in broken line a rear end portion of a typical utility vehicle such as a garden tractor, riding lawnmower or an ATV. Such vehicles typically have a frame plate 10 extending horizontally at the rear thereof onto which the trailer hitch assembly 12 of the present invention is attached. The trailer hitch assembly is seen to comprise a lower steel plate 14 which is welded to a tubular steel post 16 so that there is an acute angle 18 between the post 16 and the lower plate 14. The lower plate 14 is adapted to be fastened by a bolt 20 that is fitted through a washer 22 and an aperture 24 formed in the lower plate 14 (FIG. 2) and secured by a lock washer 26 and a nut 28.

A tubular post 16 is preferably a of a rectangular cross section but also can be round. A tubular shaft 32 of a corresponding cross section is sized so that the tubular shaft 32 will fit within the lumen 30 of the tubular post 16 and be slidable therein.

Welded to an upper end of the tubular shaft 32 is an upper plate 34 that extends parallel to the lower plate 14. The upper plate 34 has an aperture 36 formed therethrough for receiving a threaded cylindrical base 38 of a hitch ball 40 therethrough. The hitch ball 40 is secured to the plate 34 by a nut 42. The rectangular shaft member 32 is shown having opposed side surfaces 44 and 46. Drilled through these two sides is a plurality of regularly spaced apertures. The post 16 also has a pair or aligned apertures extending through opposed side surfaces thereof whereby the height of the hitch ball 40 can be adjusted by selecting a desired one of the plurality of holes in the shaft 32 with the aligned apertures 48 which allows a pin 50 to be inserted through aperture 48 and through the selected one of the plural apertures in the shaft 44.

Because the frame plate 10 may not be sufficiently rigid to support the tongue weight of a trailer to be towed, it has been found expedient to provide the trailer hitch of the present invention with further support by way of a pair of metal straps 52 and 54 that are fastened at one end to the tubular post 16 and at the other end to a vertical plate 56 (FIG. 1) forming part of the frame structure of the towing vehicle.

Figure 2:
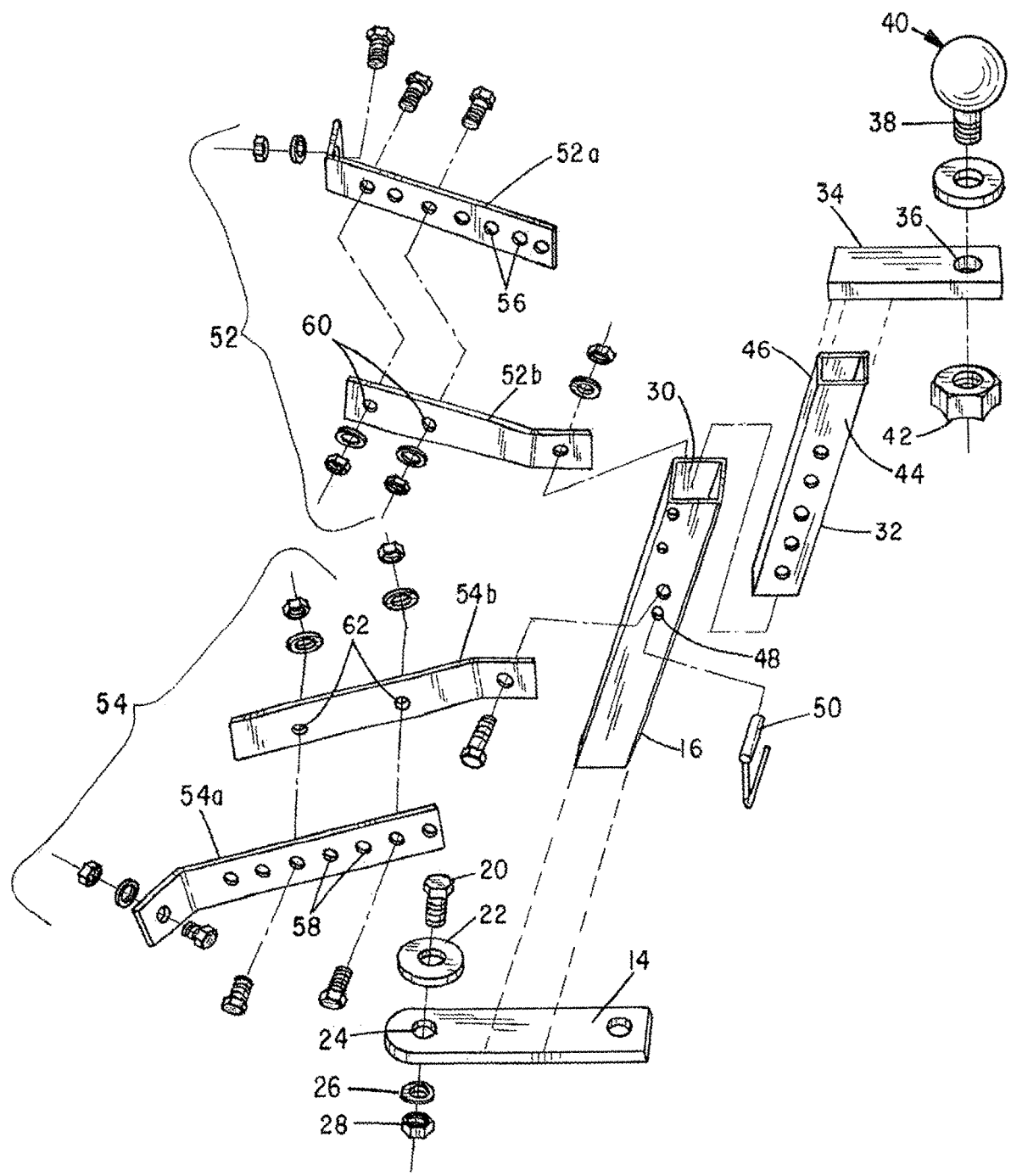
FIG. 2 is an exploded view of the preferred embodiment.

As best seen in FIG. 2, the metal straps are of a two-piece construction, arranged in such a way that the overall length thereof can be adjusted. Examining the rigid strap 52, it comprises a first section 52a and a second section 52b and likewise the second rigid strap 54 comprises a first section 54a and a second section 54b. The strap sections 52a and 54a each have a series of longitudinally aligned and regularly spaced apertures as at 56 and 58. Likewise, the strap sections 52b and 54b include a pair of apertures 60, 62 that are spaced apart such that these later apertures can be brought into alignment with a selected pair of the apertures 56 and 58 on the first strap sections 52a and 54a. The strap sections are adapted to be joined by passing bolts through a selected pair of the apertures on the sections 52a and 54a and then through the apertures 60 or 62 on the associated strap segments 52b and 54b such that the overall length of these two straps will extend between the tubular post 16 and a fastening point on the frame of the towing vehicle as seen in FIG. 1. The bolts are secured using washers and nuts as fully shown in the exploded view of FIG. 2.

By making the strap lengths of the straps 52 and 54 adjustable the hitch assembly of the present invention can be readily fitted to vehicles of several different manufacturers. Likewise, because the height of above ground of the hitch ball 40 is also made adjustable the hitch assembly of the present invention may be used with a variety of towed carts and trailers.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A trailer hitch for a utility vehicle comprising:
(a) an elongated tubular post having a lumen and first and second ends, the first end being affixed to a first plate member at an acute internal angle to the tubular post, the first plate adapted to be removably secured to a frame member of a utility vehicle;
(b) a shaft member sized to fit and slide within the lumen of the tubular post and having a second plate member affixed to an end of the shaft member so as to extend parallel to the first plate member when the shaft member is telescopingly inserted into the lumen of the tubular post, the second plate member having a trailer hitch ball mounted thereon; and
(c) at least one rigid strap member of an adjustable length fastened at one end at a point between the first and second ends of the tubular post and a second end of the strap adapted to be connected to the frame member of the utility vehicle.

2. The trailer hitch as in claim 1 wherein the tubular post has a rectangular cross section and a pair of aligned apertures formed individually through opposed side walls thereof.

3. The trailer hitch as in claim 2 wherein the shaft member has a plurality of apertures along a length dimension thereof and further including a pin insertable through the aligned apertures formed through the opposed sidewalls of the tubular post and through a selected one of the plurality of apertures in the shaft member to set the hitch ball at a desired height with respect to the first plate member.

4. The trailer hitch as in claim 3 wherein there are two rigid strap members extending in coplanar relationship between the tubular post and a frame member of the utility vehicle.

5. The trailer hitch as in claim 4 wherein the two rigid strap members each include first and second sections that partially overlap and are secured to one another by bolts extending through selected ones of a plurality of apertures formed through the overlapped first and second sections whereby the length of each strap is adjustable.

* * * * *